United States Patent [19]

Iwashita

[11] Patent Number: 5,799,183
[45] Date of Patent: Aug. 25, 1998

[54] METHOD OF PROCESSING DATA BATCH TRANSFER AMONG THE MEMORIES IN A COMPUTER SYSTEM HAVING A HIERARCHICAL MEMORY STRUCTURE

[75] Inventor: Hidetoshi Iwashita, Kawasaki, Japan

[73] Assignee: Fujitsu Limited, Kawasaki, Japan

[21] Appl. No.: 242,451

[22] Filed: May 13, 1994

[30] Foreign Application Priority Data

Jul. 27, 1993 [JP] Japan .................................. 5-185065
Nov. 24, 1993 [JP] Japan .................................. 5-292919

[51] Int. Cl.⁶ .................................................. G06F 17/30
[52] U.S. Cl. ..................... 395/602; 395/604; 395/607; 395/614; 395/706; 395/671
[58] Field of Search ............................ 395/600, 425, 395/650, 575, 602, 604, 607, 614, 706, 671

[56] References Cited

U.S. PATENT DOCUMENTS

| | | | |
|---|---|---|---|
| 5,115,392 | 5/1992 | Takamoto et al. ...................... | 395/600 |
| 5,233,702 | 8/1993 | Emma et al. ............................ | 395/425 |
| 5,437,034 | 7/1995 | Tanaka et al. .......................... | 395/700 |
| 5,457,793 | 10/1995 | Elko et al. .............................. | 395/600 |
| 5,561,784 | 10/1996 | Chen et al. ............................. | 395/484 |

*Primary Examiner*—Wayne Amsbury
*Assistant Examiner*—Cheryl R. Lewis
*Attorney, Agent, or Firm*—Staas & Halsey

[57] ABSTRACT

A method for optimizing a program by performing a data batch transfer between a first and second memories when data is read from the second memory into the first memory and when the data is written from the first memory into the second memory. The optimization processing includes analyzing the preference order relation of the accesses, in a loop procedure having accesses to array data in the second memory, classifying the array accesses in the loop into groups that need to be shared in the storage regions in which the data are temporarily stored in the first memory, finding the sum of sets of access elements for the accesses pertaining to each of the groups, determining a range of transferring the data, and generating, outside the loop, an instruction code for batchwisely making accesses to the array data on a transfer range pertaining to each of the groups.

7 Claims, 11 Drawing Sheets

```
DO i=1,100
  c(i)=A(i)+b(i)
  A(i-1)=c(i)
END DO
```

```
c(1:100)=A(1:100)+b(1:100)
A(0:99)=c(1:100)
```

```
read tmp1(1:100)=A(1:100)
c(1:100)=tmp1(1:100)+b(1:100)
tmp2(0:99)=c(1:100)
write A(0:99)=tmp2(0:99)
```

```
DO i=1,100
  c(i)=A(i)+b(i)
  A(i+1)=c(i)
END DO
```

Fig. 6

|  | f:REFERENCE g:DEFINITION | f:DEFINITION g:REFERENCE | f:DEFINITION g:DEFINITION |
|---|---|---|---|
| f→g | — | ○ | ○ |
| f←→g | ○ | ○ | ○ |
| g→f | ○ | — | ○ |
| φ | — | — | — |

Fig. 7a

```
DO J=1,100
  DO I=1,100
    A(I,J) = ···          u1
    ··· = A(J,I)          u2
    ··· = A(I,J+30)       u3
    A(I,J+100) = ···      u4
    ··· = A(I,1)          u5
  END DO
END DO
```

Fig. 7b

| f \ g | u1 | u2 | u3 | u4 | u5 |
|---|---|---|---|---|---|
| u1 | φ | f←→g | g→f | φ | f→g |
| u4 | φ | φ | f→g | φ | φ |

Fig. 8

```
alloc a1(100,100)
alloc a2(100,170)

read a1(1:100,1:100)=A(1:100,1:100)         ∧ (S1)
read a2(1:100,1:100)=A(1:100,31:130)        ∧ (S2)

DO J=1,100
  DO I=1,100
    a1(I,J)=···                             u1
    ···=a1(J,I)                             u2
    ···=a2(I,J)                             u3
    a2(I,J+70)= ···                         u4
    ···=a1(1,1)                             u5
  END DO
END DO write A(1:100,1:100)=a1(1:100,1:100)        Σ (S1)
write A(1:100,101:200)=a2(1:100,71:170)     Σ (S2)

free a1
free a2
```

Fig.11

```
alloc a1(100,100)
alloc a2(100,170)

read a1(1:100,1:100)=A(1:100,1:100)      ∧ (S1)
read a2(1:100,1:70)=A(1:100,31:100)      ∧ (S2)

DO J=1,100
  DO I=1,100
    a1(I,J)=···                          u1
    ···=a1(J,1)                          u2
    ···=a2(I,J)                          u3
    a2(I,J+70)= ···                      u4
    ···=a1(1,1)                          u5
  END DO
END DO write A(1:100,1:100)=a1(1:100,1:100)     Σ (S1)
write A(1:100,101:200)=a2(1:100,71:170)  Σ (S2)

free a1
free a2
```

Fig.12

```
alloc a(100,200)

read a(1:100,1:100)=A(1:100,1:100)       ∧ (S1) U ∧ (S2)

DO J=1,100
  DO I=1,100
    a(I,J)= ···                          u1
    ··· = a(J,I)                         u2
    ··· = a(I,J+30)                      u3
    a(I,J+100)= ···                      u4
    ··· = a(I,1)                         u5
  END DO
END DO write A(1:100,1:200)=a(1:100,1:200)      Σ (S1) U Σ (S2)

free a
```

Fig.13a
```
DO i=1,100
  c(i)=A(i)+b(i)
  A(i+1)=c(i)
END DO
```

Fig.13b
```
read tmp(1:100)=A(1:100)
DO i=1,100
c(i)=tmp(i)+b(i)
tmp(i+1)=c(i)
END DO
write A(2:101)=tmp(2:101)
```

Fig.13c
```
read tmp(1:1)=A(1:1)
DO i=1,100
c(i)=tmp(i)+b(i)
tmp(i+1)=c(i)
END DO
write A(2:101)=tmp(2:101)
```

METHOD OF PROCESSING DATA BATCH TRANSFER AMONG THE MEMORIES IN A COMPUTER SYSTEM HAVING A HIERARCHICAL MEMORY STRUCTURE

BACKGROUND OF THE INVENTION

1. Field of the Invention

The present invention relates to a computer system such as a parallel computer or the like having a hierarchical memory structure. More particularly, the invention relates to a technique of processing data batch transfer among the memories based upon the optimization of a program that is operated in the computer system.

A model memory in the form of far and near two strata is usually employed in a parallel computer system, in a network-connected dispersed computer environment system and in a computer system which uses an external mass storage device. In the computer systems having such a hierarchical memory structure, the overhead must be decreased by decreasing the number of times of data transfer among the memories and by decreasing the total amount of data transfer.

2. Description of the Related Art

In a parallel computer, in a network-connected distributed computer environment and in a computer which uses an external mass storage device, use is made of a model memory in the form of far and near two strata as shown in FIG. 1, wherein reference numeral 80 denotes a processor, 81 denotes a local memory space to which the processor 80 can make a direct access at a high speed; and 82 denotes a global memory space for holding the data to which access is made via the local memory space 81. The global memory space 82 may be a virtual one or a physical one (such as a local memory in another processor in a distributed memory-type parallel computer).

In a computer constitution shown in FIG. 1, the overhead at the time of start-up can be decreased and the data can be efficiently transferred between the global memory space 82 and the local memory space 81 when they are transferred in a decreased number of times by being batchwisely transferred instead of being transferred by individual elements. It is further desired to decrease the amount of data transfer as much as possible each time.

In a loop of a program shown in, for example, FIG. 2a that pertains to the conventional art and where there exists an instruction that makes reference to, or defines, the array data A(i) in the global memory space, however, it had not been considered to batchwisely transfer the minimum required data only between the global memory space 82 and the local memory space 81. Therefore, the data were transferred many times and the total amount of data transfer tended to increase. In the following description, the array data on the global memory space 82 are expressed using an array name [e.g., A(i)] that starts with a capital letter of an alphabet, and the array data on the local memory space 81 are expressed using an array name [e.g., b(i)] that starts with a small letter of an alphabet.

A technique for handling the data on a loop with a unit which is as large as possible can be represented by an optimization processing method in a so-called vector computer. In the vector employed here, the preference order relation of data to which access are made is analyzed to generate an instruction code, in order to efficiently execute the vector calculation of data in amounts as large as possible. As described above, the data should be transferred a decreased number of times between the global memory space 82 and the local memory space 81 by being batchwisely transferred instead of being transferred by individual elements, since this helps to decrease the overhead at the time of start-up and to increase the efficiency. Mentioned below therefore is how to utilize the vector technology. By batchwisely transferring the data by utilizing the vector technology, it is considered that the data can be batchwisely transferred to some extent even in a model system which has memories of two strata. For instance, a program of FIG. 2a becomes as shown in FIG. 2b when it is described in the form of vectors, wherein c(1:100) represents elements 1 to 100 of an array c in the local memory space 81. A(1:100) represents elements 1 to 100 of an array A in the global memory space 82. The same holds true even for other notations of arrays.

First, the program shown in FIG. 2a is described in the form of vectors according to an existing method shown in FIG. 2b and, then, a data transfer (read/write) instruction is added as shown in FIG. 2c based thereupon. That is, a reference to the global arrangement A is replaced by a read from the global memory space 82 to the local memory space 81 and by a reference to a temporary region (tmp1), and a definition of the global array A is replaced by a definition of a temporary region (tmp2) in the local memory space 81 and by a write from the temporary region (temp2) to the global memory space 82.

According to this method, however, the data cannot be batchwisely transferred when the program cannot be described in the form of vectors due to a data-dependency relation. This can be the case of, for example, a program shown in FIG. 2d. In this program, a reference to the array A(1) and a definition of the array A(2) are carried out in the same loop, and the array A(2) is referred to in the next loop. Therefore, the definition of the array A(2) is executed earlier than the reference to the array A(2). When described in the form of vectors, however, this order is reversed. Therefore, the program cannot be described in the form of vectors. That is, in this case, the data can be batchwisely transferred by suitably sharing the temporary regions but cannot be done as far as the vector technology is relied upon.

The vector technology chiefly deals with a single loop, which makes it difficult to batchwisely handle the elements in an amount sufficient for efficiently transferring the data. In a vector description, in general, several tens of elements are sufficient. In transferring the data, however, a sufficiently improved efficiency is, in many cases, perceived only after several thousand to several tens of thousand elements are batchwisely transferred. When the loops are multiplexed, in particular, technology is required for batchwisely transferring the data over the whole multiplexed loop.

SUMMARY OF THE INVENTION

An object of the present invention is to batchwisely transfer the data even on a loop or on a multiplexed loop on which the program cannot be described in the form of vectors in a computer system having a hierarchical memory structure and, hence, to execute the program at high speeds.

Another object of the present invention is to execute a program at a further increased speed by decreasing the amount of data transferred among the memories in the above-mentioned computer system.

According to a fundamental aspect of the present invention, there is provided a method of processing data batch transfer when the data are being written from a first memory into a second memory and when the data are being read from said second memory into said first memory based upon an optimization processing of a program that is operated in a computer system having at least one processor, said first memory to which said processor makes an access at a high speed, and said second memory which forms a hierarchical memory structure together with said first memory, wherein said optimization processing comprises: a first step of, when there is given a loop procedure inclusive of accesses to array data in said second memory, analyzing the preference order relation of the accesses; a second step of, based upon a result analyzed by said first step, classifying the array accesses in the loop into groups that need be shared in the storage regions in which the data are temporarily stored in said first memory; a third step of finding the sum of sets of access elements for the accesses pertaining to each of the groups and determining a range of transferring the data; and a fourth step of generating outside the loop an instruction code for batchwisely making accesses to the array data on a transfer range pertaining to each of said groups.

Also, the third step may include a substep which excludes from the read transfer range a set of access elements defined prior to the reference among the sets of access elements referred to in the loop for the accesses pertaining to each of the groups, and a substep which finds the sum of sets of access elements for the read transfer range and for the write transfer range for each of the groups, and determines a range of transferring the data.

Furthermore, the fourth step may include a substep which forms, before a corresponding loop, an instruction code that batchwisely makes accesses to the array data in said read transfer range, and forms, after said loop, an instruction code that batchwisely makes accesses to the array data in said write transfer range.

BRIEF DESCRIPTION OF THE DRAWINGS

Other objects and features of the present invention will be described hereinafter in detail by way of preferred embodiments with reference to the accompanying drawings, in which:

FIG. 6 is a diagram explaining a logic for determining a shadow group;

FIGS. 7a and 7b are diagrams explaining an example of optimization processing;

FIG. 8 is a diagram illustrating an example of output codes according to the first embodiment of the present invention;

FIG. 11 is a diagram illustrating an example of output codes according to the second embodiment of the present invention;

FIG. 12 is a diagram illustrating another example of output codes according to the second embodiment of the present invention;

FIGS. 13a to 13c are diagrams illustrating the results to which the present invention is adapted.

DESCRIPTION OF THE PREFERRED EMBODIMENTS

Figures 1, 2A, 2B, 2C, 2D:
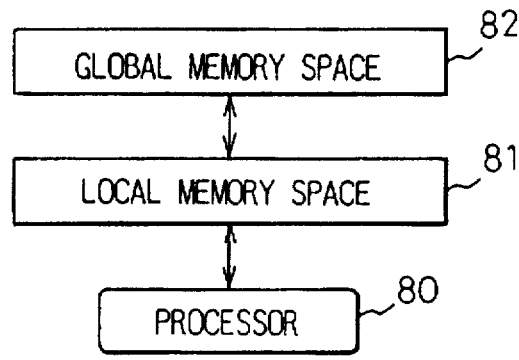
FIG. 1 is a diagram illustrating a model of a two-stratum memory.
FIGS. 2a to 2d are diagrams explaining problems inherent in the prior art.
Figure 3A:
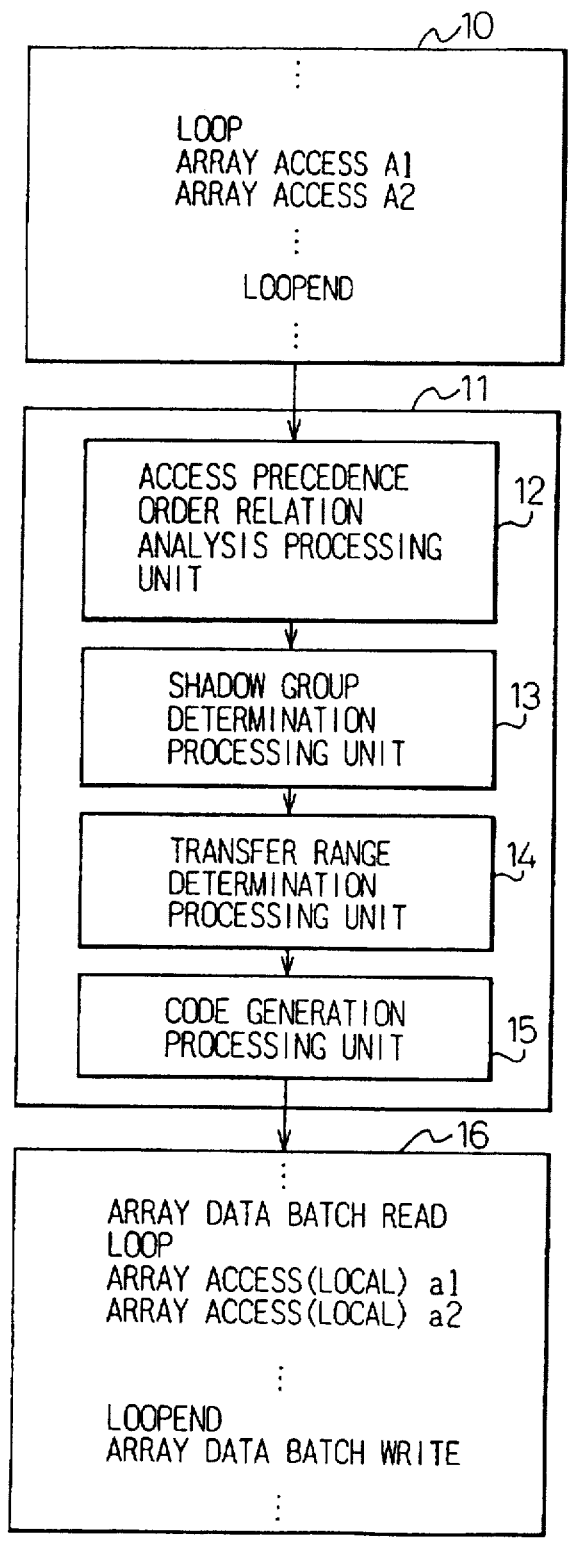
FIGS. 3a and 3b are diagrams illustrating the principle of a method of processing data batch transfer according to the present invention.
Figure 3B:
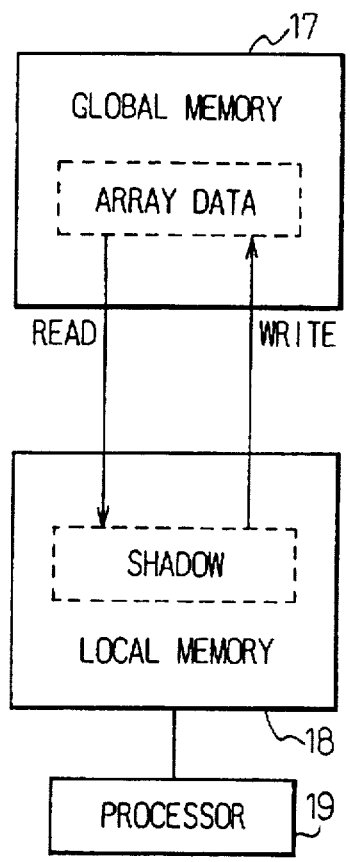

FIGS. 3a and 3b are diagrams illustrating the principle of the method of processing data batch transfer according to the present invention.

A program 10 shown in FIG. 3a is the one that is executed by a computer system shown in FIG. 3b and has a loop procedure which includes array data accesses held by a global memory 17. A processor 19 neither directly reads and processes the array data of the global memory 17 in response to an ordinary operation instruction nor directly writes the data into the global memory 17. That is, the data are once transferred to a local memory 18 and are processed therein. To write the data, the result of processing is transferred from the local memory 18 to the global memory 17. A copy of the global memory 17 in the local memory 18 is called "shadow".

An optimization processing unit 11 is a means which optimizes the program 10 to execute the operation at a high speed. According to the present invention, the following processings are carried out by the processing units.

In response to the program 10 having a loop procedure including array data accesses in the global memory 17, an access preference order relation analysis processing unit 12 works to analyze the preference order relation of the accesses.

Based upon the result of analysis of the preference order relation of accesses, a shadow group determination processing unit 13 classifies the array accesses in the loop into groups (called "shadow groups") which share the shadow. That is, a plurality of array accesses having a predetermined preference order relation are so classified as to necessarily pertain to the same group.

A transfer range determination processing unit 14 finds the sum of sets of access elements for the accesses pertaining to each of the shadow groups and determines a range of transferring the data. According to a second embodiment (described later) of the present invention, in particular, the transfer range determination processing unit 14 reads a set of access elements, defined prior to the reference out of the sets of access elements which are referred to in the loop, excludes this set out of the transfer range, finds the sum of sets of access elements for the read transfer range and for the write transfer range, and determines the range of transferring the data in order to further decrease the amount of the data that are to be read out and transferred.

A code generation processing unit 15 generates, outside the loop, an instruction code which batchwisely makes accesses to the array data of the transfer range pertaining to each of the shadow groups, and changes the array accesses to the global memory 17 in the loop into shadow accesses. Thus, an optimized program 16 is formed and is output.

The present invention is concerned with a system shown in FIG. 3b wherein the overhead is decreased and the amount of data transfer is decreased by batchwisely making accesses to the global memory 17. For this purpose, the array accesses in the loop are grouped, based upon the preference order relation thereof, and batch accesses corresponding to the groups are generated outside the loop.

In the program 10 that is to be optimized, for example, when the loop contains array data accesses A1, A2, . . . , of the global memory, they are classified into groups that share the shadow to determine the transfer range and the shape of the shadow. Then, an instruction for batchwisely reading the necessary array data from the global memory 17 is added in front of the loop for each shadow, and an instruction for batchwisely writing the array data that are the results of processings is added after the loop. In the loop, access is made to a shadow in the local memory 18.

This eliminates the need of transferring the data with an element as a unit to, and from, the global memory 17 for every execution of the loop, and the number of times of transferring the data is decreased and the amount of data transfer is decreased due to batchwise transfer and, hence, a program is executed at a high speed. The execution at a high speed can be realized even when the program cannot be described in the form of vectors.

According to a second embodiment of the present invention described later, furthermore, array elements which need not be read out are calculated based upon the data dependency analysis and are excluded from the object of being read out. This makes it possible to further decrease the amount of data to be transferred.

Figure 4:
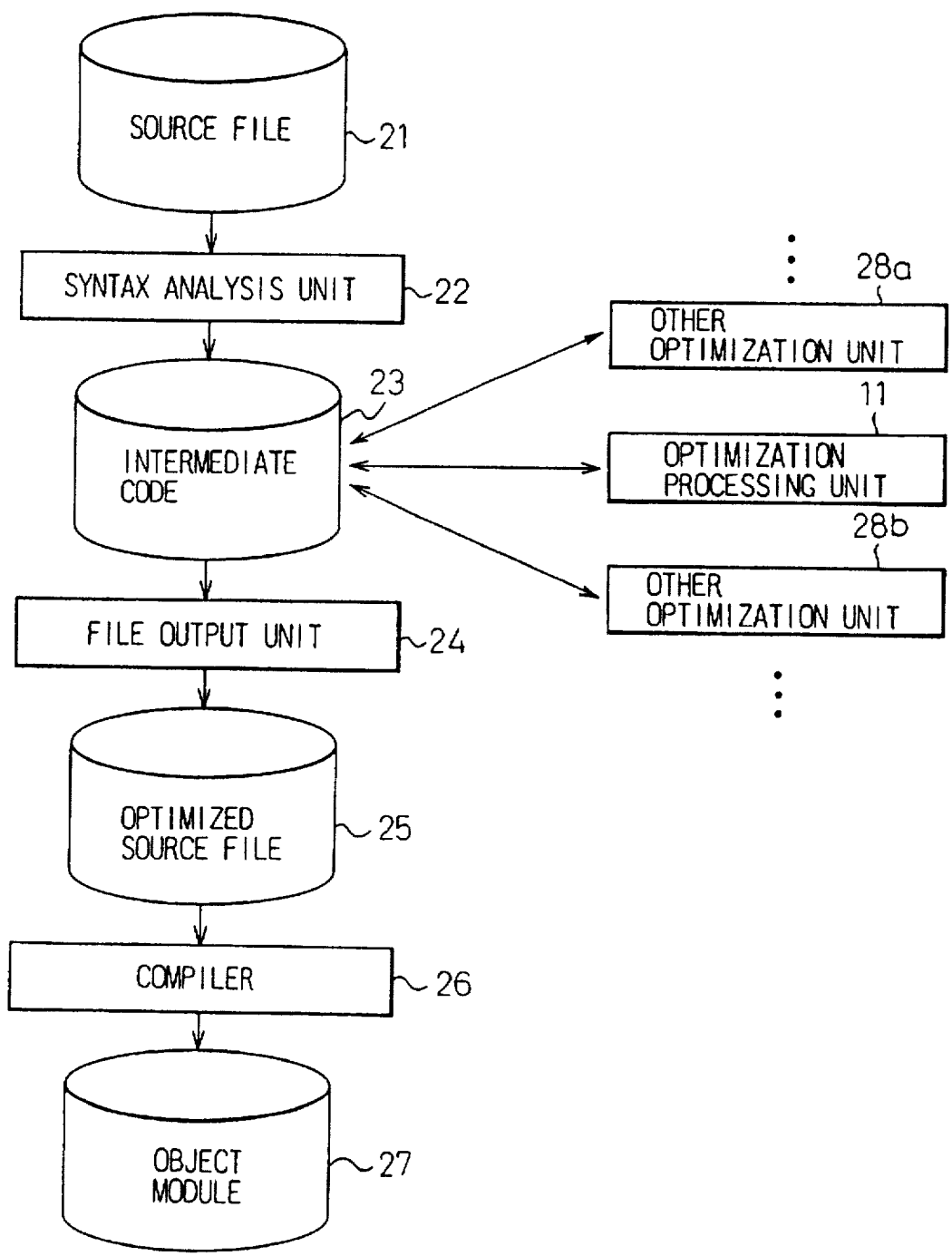
FIG. 4 is a diagram of an example to which the present invention is adapted.

FIG. 4 is a diagram of an example to which the present invention is adapted.

In FIG. 4, a source file 21 stores a source program that is to be optimized. A syntax analysis unit 22 reads the source program from the source file 21, analyzes the syntax according to a predetermined syntax rule and outputs the result of analysis as an intermediate code 23 which is a data of an internal form determined by the computer system and has a content substantially the same as that of the source program. The intermediate code 23 may in practice be held as a file or may be held in the memory.

Here, the optimization according to the present invention is carried out by the optimization processing unit 11. It is further allowable to carry out the optimization by other optimization units 28a and 28b before and after the optimization of the present invention. A file output unit 24 outputs an optimized source file 25 based upon the intermediate code 23 after the optimization processing. This is compiled as an input file to the compiler 26 thereby to generate an object module 27 which batchwisely transfers the data.

The system shown in FIG. 4 is a constitution for optimization by the so-called pre-compiler system. The optimization processing, however, may be executed inside the compiler 26 without relying upon the pre-compiler system.

Next, the preferred embodiments of the present invention will be explained in detail with reference to FIGS. 5 to 12.

First Embodiment (see FIGS. 5 to 8)

Figure 5:
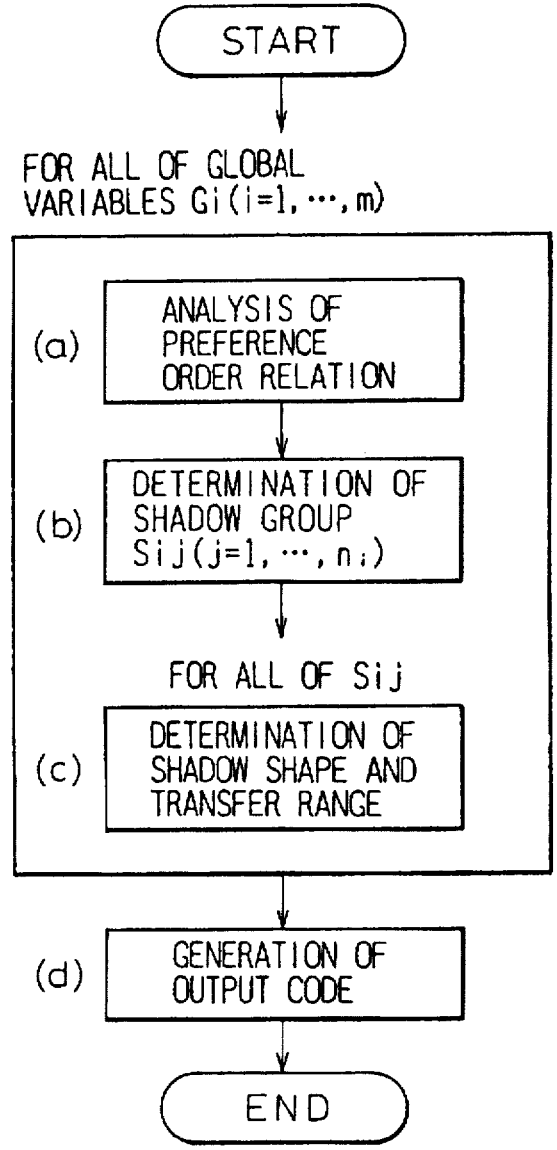
FIG. 5 is a flow chart of the processing of data batch transfer according to a first embodiment of the present invention.

FIG. 5 is a flow chart for explaining the processing of data batch transfer according to a first embodiment of the present invention.

The processings (a) to (c) shown in FIG. 5 are executed for all of the global variables Gi (i=1, . . . , m) and, finally, the processing (d) is executed. Here, the global variables are the ones provided in the global memory 17 shown in FIG. 3b. Hereinafter, the embodiment of the invention will be described in compliance with the flow of this processing.

(a) Analysis of the preference order relations

The preference order relations are found for all sets (f, g) that make access to the same object arrays except the case where reference is made to both f and g. The preference order relations are discriminated concerning the following four types. The preference order relations can be analyzed by using an existing technology which has been known as vector technology.

(1) f→g Access f precedes access g at all times.
(2) g→f Access g precedes access f at all times.
(3) f←→g Access f may precede access g, or vice versa. Or the relation of order is ambiguous.
(4) φ Accessible array elements are not overlapped.

(b) Determination of the shadow groups Sij (j=1, . . . $n_i$)

Accesses to the object arrays are classified into groups (shadow groups) that share the shadow. FIG. 6 is a diagram explaining a logic for determining the shadow groups. The two accesses, of which the preference order has a relation of open circles in FIG. 6, are so classified as to necessarily pertain to the same group. For instance, when the access f precedes the access g at all times and f is a definition and g is a reference, these two accesses are classified to pertain to the same group.

(c) Determination of the shadow shapes and transfer ranges

The following processings are carried out for all of the shadow groups Sij determined in (b) above.

(1) The sums of sets of access elements are found for the reference and definition pertaining to the shadow group. The thus found sums of sets serve as ranges for reading and writing the shadow. The range for reading the data is denoted by $\Lambda$ and the range for writing the data is denoted by E.

(2) The sum of sets $\Lambda$ and E is found. This is called shadow space. A function or a table is found that indicates mapping between the elements and the positions on the shadow space. In the following description, the mapping is denoted by M.

When the shadow spaces are overlapped and it is so judged that the memory region can be saved by sharing them, then the plurality of the shadows are shared so as to work as a single shadow. In this case, $\Lambda$ and E are those of the sum of sets $\Lambda$ and E of the initial shadow.

(d) Generation of the output codes

A code corresponding to the shadow space and to $\Lambda$ and E, is generated for each of the shadows.

(1) A code is generated to dynamically or statically secure the shadow space. A slightly large region may be secured to include the necessary shadow space.

(2) A code for reading $\Lambda$ from the global memory into the shadow is generated just before the loop. Similarly, a code for writing E from the shadow into the global memory is generated just after the loop.

(3) The access portion to the global memory in the loop is deformed into an access to the shadow depending upon the mapping M.

Described below is a practical example of optimization processing.

Here, for instance, a program shown in FIG. 7a is optimized. This program has a multiple loop for the loop variables J and I. The array A is a global variable.

(a) Analysis of the preference orders

The preference order relations of the above-mentioned four types are examined with the array accesses u1 and u4 shown in FIG. 7a as f and the array accesses u1 to u5 as g. There are obtained the results of analysis of the preference order relations as shown in FIG. 7b. For example, the access u1 and the access u2 are a definition of A(I, J) and a reference of A(J, I), respectively, and the positions of I and J are reversed. Therefore, there may exist a case where u1 precedes and a case where u2 precedes. As for the access u1 and u3, furthermore, u3 is A(I, J+30) and, hence, precedes A(I, J) of u1 at all times. (b)

Determination of the shadow groups

If the results of analysis of precedence order relations shown in FIG. 7b are fitted to the logic of determining the sharing shown in FIG. 6, the following pairs of accesses are obtained that must be shared.

(1) u1 and u2
(2) u1 and u5
(3) u3 and u4

Therefore, there are the following two shadow groups.

(1) S1={u1, u2, u5}
(2) S2={u3, u4}

(c) Determination of the shadow shapes and transfer ranges

The shadow space is determined as follows for the shadow group S1.

$$\begin{aligned}
\Lambda &= (\text{access range of } u2) \cup (\text{access range of } u5) \\
&= \{(1,1),(2,1),\ldots,(100,1),\ldots,(100,100)\} \\
\Sigma &= (\text{access range of } u1) \\
&= \{(1,1),(2,1),\ldots,(100,1),\ldots,(100,100)\} \\
\Lambda \cup \Sigma &= \{(1,1),(2,1),\ldots,(100,1),\ldots,(100,100)\}
\end{aligned}$$

From the above results, a two-dimensional array a1 (100, 100) is secured as a shadow region on the local memory. The global and the shadow make the elements having the same affixed character corresponded to each other, i.e., make A(i, j) and a1(i, j) corresponded to each other.

Moreover, the shadow space is determined as follows for the shadow group S2.

$$\begin{aligned}
\Lambda &= (\text{access range of } u3) \\
&= \{(1,31),(2,31),\ldots,(100,31),\ldots,(100,130)\} \\
\Sigma &= (\text{access range of } u4) \\
&= \{(1,101),(2,101),\ldots,(100,101),\ldots,(100,200)\} \\
\Lambda \cup \Sigma &= \{(1,31),(2,31),\ldots,(100,31),\ldots,(100,200)\}
\end{aligned}$$

From the above results, a two-dimensional array a2 (100, 170) is secured as a shadow region. The global and the shadow make the two-dimensional ones corresponded to each other being deviated by 30, i.e., make A(i, j) and a2(i, J−30) corresponded to each other.

(d) Generation of the output codes

A code for securing the shadow space is generated for the shadow groups S1 and S2, a code for reading Λ from the global memory into the shadow and a code for writing E from the shadow into the global memory are added to just before and just after the loop, respectively. Furthermore, the accesses in the loop are changed into accesses to the arrays a1 and a2.

As a result, a code having a content as shown in FIG. 8 is generated. That is, the program shown in FIG. 7a is converted into an optimized program that is shown in FIG. 8.

In FIG. 8, alloc is an instruction for allocating a region of the local memory, and "alloc a1(100,100)" instructs to secure the two-dimensional array a1 of 100×100 elements in the local memory. Similarly, "alloc a2(100,170)" instructs to secure the two-dimensional array a2 of 100×170 elements in the local memory.

Read is an instruction for transferring (reading) the data from the global memory into the local memory, and "read a1(1:100, 1:100)=A(1:100, 1:100)" instructs to transfer the data of from A(1, 1) through up to A(100, 100) of the two-dimensional array into the regions of from a1(1, 1) to a1(100, 100). The next "read a2(1:100, 1:100)=A(1:100, 31:130)" instructs to transfer the data of from A(1, 31) through up to A(100, 130) of the two-dimensional array to the regions of from a2(1, 1) to a2(100, 100).

The instructions of accesses u1 to u5 are changed into accesses corresponding to the regions to which the arrays a1 and a2 are corresponded as shown in FIG. 8.

Write is an instruction for transferring (writing) the data from the local memory into the global memory, and "write A(1:100, 1:100)=a1(1:100, 1:100)" instructs to transfer all of the data from a1(1, 1) through up to a1(100, 100) of the two-dimensional array into the regions of from A(1, 1) to A(100, 100). The next "write A(1:100, 101:200)=a2((1:100, 71:170)" instructs to transfer all of the data from a2(1, 71) through up to a2(100, 170) of the two-dimensional array to the regions of from A(1, 101) to A(100, 200).

"Free a1" and "free a2" are instructions for releasing the regions of the arrays a1 and a2 on the local memory.

Second Embodiment (see FIGS. 9 to 12)

Figure 9:
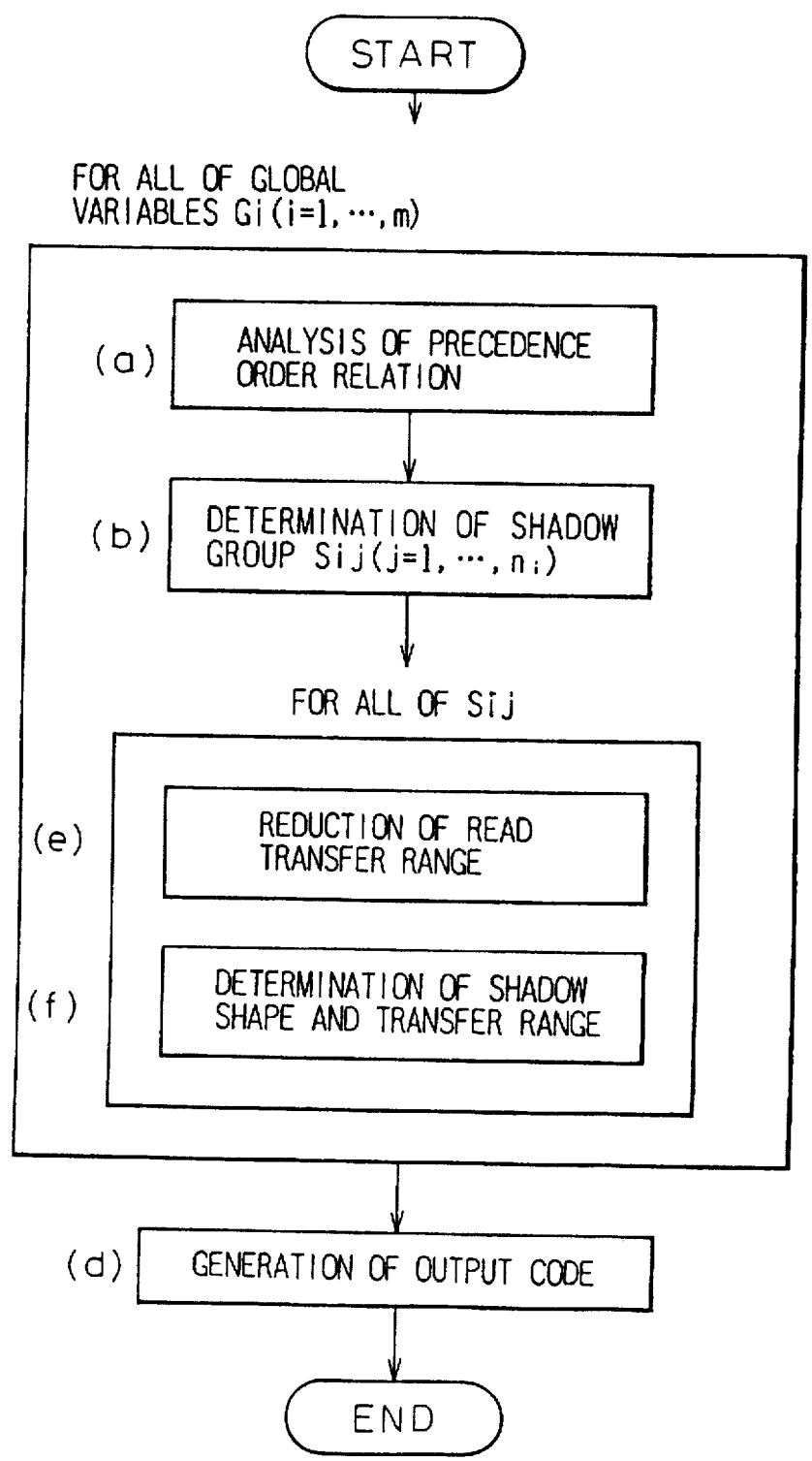
FIG. 9 is a flow chart explaining the processing of data batch transfer according to a second embodiment of the present invention.

FIG. 9 is a flow chart illustrating the data batch transfer processing according to a second embodiment of the present invention.

The processings (a), (b), (e) and (f) shown in FIG. 9 are executed for all of the global variables Gi (i=1, ..., m) and, finally, the processing (d) is executed. Here, the global variables are the ones provided in the global memory 17 shown in FIG. 3b. Hereinafter, the embodiment of the present invention will be described in line with the flow of these processings. Here, however, the processings (a), (b) and (d) are the same as those of the first embodiment of the present invention and are not described again.

(e) Reduction of the read transfer range

Figure 10:
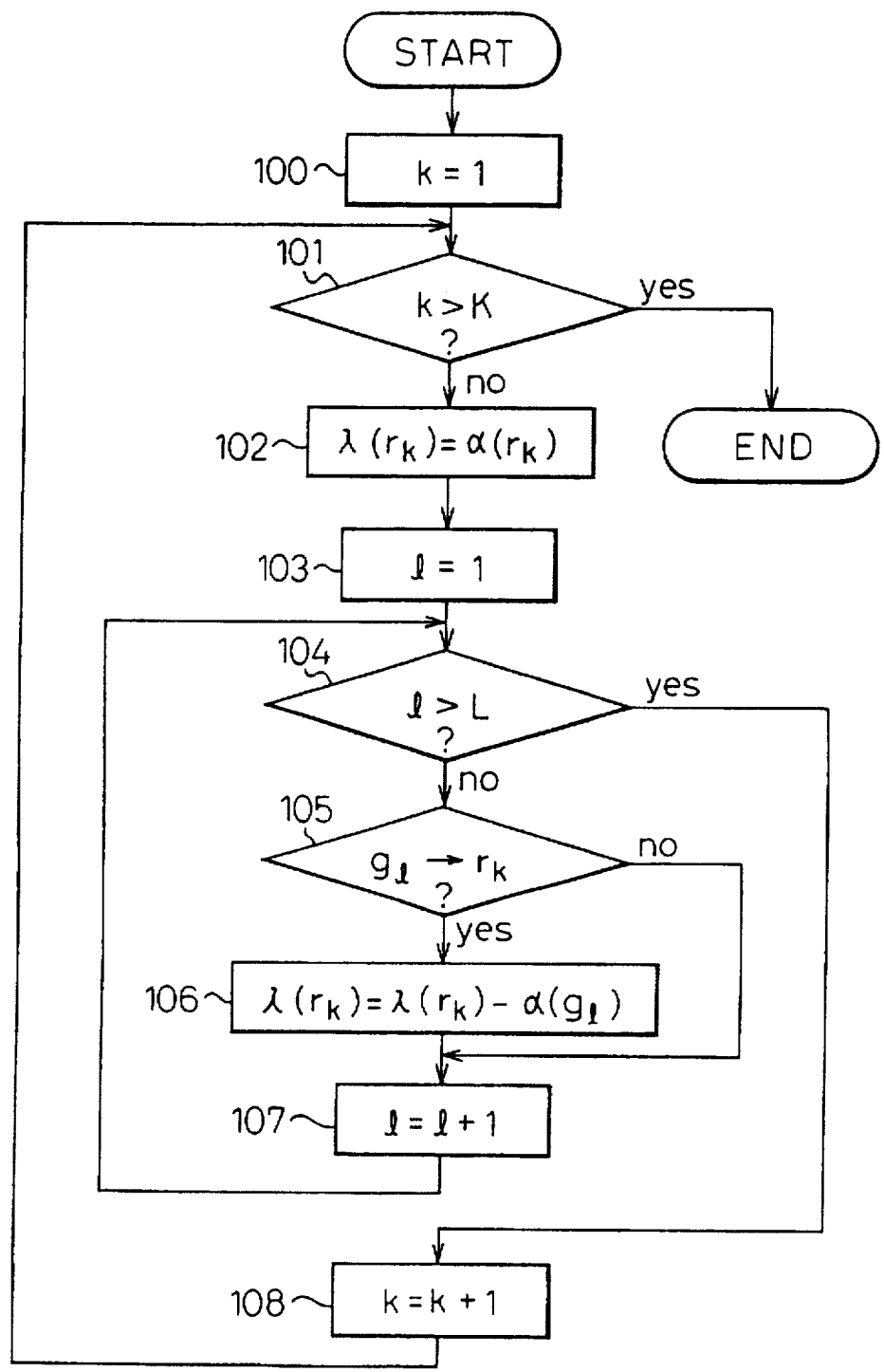
FIG. 10 is a flow chart explaining the processing for reducing the read transfer range in FIG. 9.

Among the sets of array elements of the shadow groups Sij (j=1, ..., $n_i$) determined by the processing (b), the range of access elements that can be excluded from the read transfer range is detected. FIG. 10 is a flow chart explaining the processing for reducing the read transfer range.

In FIG. 10, references pertaining to the shadow group Sij are denoted by $r_k$ (k=1, ..., K), definitions pertaining to the shadow group Sij are denoted by gl (l=1, ..., L), a set of array elements to which accesses are made with a reference or a definition f is denoted by α(f), and the following processings are carried out for all of the references $r_k$.

(1) For all of the references $r_k$, an initial value α($r_k$) is set to the reference $r_k$ read transfer range λ($r_k$).

(2) Check whether it pertains to the same shadow group as that of the reference $r_k$ and if the preference order has a relation $g_l \rightarrow r_k$.

(3) A difference in the sets between λ($r_k$) and α(gl) is found and is set to be λ($r_k$). This is repeated for all of the definitions $g_l$.

That is, initialization is accomplished as k=1 (processing 100), k is increased 1 by 1 by the processing 108, and the following processings are carried out until k exceeds the number K of the references (processing 101). The processing 102 reads the k-th reference $r_k$ and sets the initial value of the read transfer range λ($r_k$) to be α($r_k$). Next, those which have a preference order relation $g_l \rightarrow r_k$ are detected for the definitions $g_l$ of from l=1 to L that pertain to the same shadow group. When they are detected, a difference in the set between λ($r_k$) and α($g_1$) is found and is replaced by λ($r_k$) (processings 103 to 107).

According to another embodiment, definitions g are detected that pertain to the same shadow group as the reference r and have a relation g ←→r, and among the common elements of λ(r) and α(g), those whose first access is a definition are deleted from λ(r).

(f) Determination of the shadow shape and the transfer range

After the above processing (e), following processings are carried out for all of the shadow groups Sij.

(1) The sum of sets of the read transfer ranges λ(r) of all references r pertaining to the shadow group is regarded to be a range of read transfer data. This is denoted by $\Lambda$. Then, the read transfer range $\Lambda$ of the shadow group Sij becomes $\Lambda = \lambda(r_1) \cup \lambda(r_2) \cup \ldots \cup \lambda(r_k)$. Moreover, the sum of sets of access ranges α(g) of all definitions g pertaining to the shadow group is regarded to be a range of shadow write transfer data. This is denoted as E.

(2) The sum of sets of $\Lambda$ and E is found. This is called shadow space. A function or a table is found in advance that indicates mapping between the elements and the positions on the shadow space.

When the shadow spaces are overlapped and it is so judged that the memory region can be saved if they are shared, then the plurality of the shadows may be shared so as to work as a single shadow. In this case, $\Lambda$ and E are those of the sum of sets $\Lambda$ and E of the initial shadow.

Next, a practical example of the optimization processing will be described in conjunction with FIGS. 7a and 7b.

Here, for example, the program shown in FIG. 7a is optimized. This program has a multiple loop for the loop variables J and I. The array A is a global variable.

(a) Analysis of the preference orders

The preference order relations of the above-mentioned four types are examined with the array accesses u1 and u4 shown in FIG. 7a as f and the array accesses u1 to u5 as g. There are obtained the results of analysis of the preference order relations as shown in FIG. 7b. For example, the access u1 and the access u2 are a definition of A(I, J) and a reference of A(J, I), respectively, and the positions of I and J are reversed. Therefore, there may exist a case where u1 precedes and a case where u2 precedes. As for the access u1 and u3, furthermore, u3 is A(I, J+30) and, hence, precedes A(I, J) of u1 at all times.

(b) Determination of the shadow groups

If the results of analysis of precedence order relations shown in FIG. 7b are fitted to the logic of determining the sharing shown in FIG. 6, the following pairs of accesses are obtained that must be shared.

(1) u1 and u2
(2) u2 and u5
(3) u3 and u4

Therefore, there are the following two shadow groups.

(1) S1={u1, u2, u5}
(2) S2={u3, u4}

(c) Reduction of the read transfer range

The read transfer range for the shadow group S1 is as described below.

As for the reference u2, the preference order relation with respect to the definition u1 is u1 ←→u2. The element u1 partly precedes the reference u2 but is neglected based upon the judgement that the pattern is complex. The read transfer range is not reduced here.

$$\lambda(u2) = \alpha(u2)$$
$$= \{(1,1),(2,1),\ldots,(100,1),\ldots,(100,100)\}$$

The definition u1 precedes the reference u5 at all times.
$\lambda(u5) = \alpha(u5) - \alpha(u1) = \phi$ As for the shadow group S2, on the other hand, the following holds.

The definition u4 precedes the reference u3 at all times.

$$\lambda(u3) = \alpha(u3) - \alpha(u4)$$
$$= \{(1,31),(2,31),\ldots,(100,31),\ldots,(100,100)\}$$

(f) Determination of the shadow shape and the transfer range

Concerning the shadow group S1, the shadow space is determined as follows:

$$\Lambda = \lambda(u2) \cup \lambda(u5)$$
$$= \{(1,1),(2,1),\ldots,(100,1),\ldots,(100,100)\}$$
$$\Sigma = \alpha(u1)$$
$$= \{(1,1),(2,1),\ldots,(100,1),\ldots,(100,100)\}$$
$$\Lambda \cup \Sigma = \{(1,1),(2,1),\ldots,(100,1),\ldots,(100,100)\}$$

From the above results, a two-dimensional array a1 (100, 100) is secured as a shadow region on the local memory. The global and the shadow make the elements having the same affixed character corresponded to each other, i.e., make A(i, j) and a1(i, j) corresponded to each other.

Moreover, the shadow space is determined as follows for the shadow group S2.

$$\Lambda = (u3)$$
$$= \{(1,31),(2,31),\ldots,(100,31),\ldots,(100,130)\}$$
$$\Sigma = (u4)$$
$$= \{(1,101),(2,101),\ldots,(100,101),\ldots,(100,200)\}$$
$$\Lambda \cup \Sigma = \{(1,31),(2,31),\ldots,(100,31),\ldots,(100,200)\}$$

From the above results, a two-dimensional array a2 (100, 170) is secured as a shadow region. The global and the shadow make the two-dimensional ones corresponded to each other being deviated by 30, i.e., make A(i, j) and a2(i, J−30) corresponded to each other.

(d) Generation of the output codes

A code for securing the shadow space is generated for the shadow groups S1 and S2, a code for reading $\Lambda$ from the global memory into the shadow and a code for writing E from the shadow into the global memory are added to before and after the loop, respectively. Furthermore, the accesses in the loop are changed into accesses to the arrays a1 and a2.

As a result, a code having a content as shown in FIG. 11 is generated. That is, an optimized program shown in FIG. 11 is obtained from the program shown in FIG. 7a.

The difference of the above-mentioned embodiment from the output code of FIG. 8 is that the read transfer range $\Lambda$ for the shadow group S2 is from A(1, 31) to A(100, 130) of the two-dimensional arrays in the case of FIG. 8, but is from A(1, 31) to A(100, 100) in the case of this embodiment, which is a reduction in the read transfer range.

In reducing the read transfer range in the 30 above processing (e), when it is judged that the shadow groups S1 and S2 are better shared, then the shadow space may be set to be:

$$\Lambda = \Lambda(S1) \cup \Lambda(S2)$$
$$= \{(1,1),(2,1),\ldots,(100,1),\ldots,(100,100)\}$$
$$\Sigma = \Sigma(S1) \cup \Sigma(S2)$$
$$= \{(1,1),(2,1),\ldots,(100,1),\ldots,(100,100)\}$$
$$\Sigma \cup \Lambda = \{(1,1),(2,1),\ldots,(100,1),\ldots,(100,100)\}$$

From the above results, a two-dimensional array a(100, 200) is secured as a shadow region on the local memory. The global and the shadow make the elements having the same affixed character corresponded to each other, i.e., make A(i, j) and a(i, j) corresponded to each other.

As a result, a code having a content as shown in FIG. 12 is generated. That is, the read transfer range A given by A(S1)υA(S2) covers a two-dimensional array A(1,1) through up to a two-dimensional array A(100, 100). Furthermore, the write transfer range E given by E(S1)υE (S2) covers a two-dimensional array A(1,1) through up to a two-dimensional array A(100, 200).

FIGS. 13a to 13c are diagrams illustrating an example to which the present invention is adapted.

When, for example, the data of a program shown in FIG. 13a are batchwisely transferred according to the first embodiment of the present invention, the output code becomes as shown in FIG. 13b. When the read transfer range is further reduced according to the second embodiment of the present invention, furthermore, the results become as shown in FIG. 13c.

As will be obvious from the original program shown in FIG. 13a, the definition of A(k) (where k=2, 3, 4, ...) precedes the reference of A(k). Therefore, A(2), A(3) ... need not be read out. In an example of FIG. 13c, the data read out from the global memory is A(1) only.

Figure 14A:
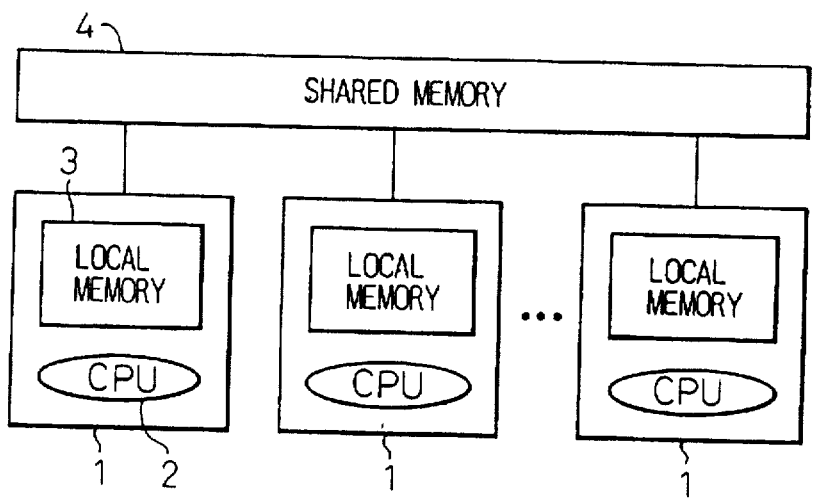
FIGS. 14a to 14c are diagrams illustrating examples of system constitutions to which the present invention is adapted.
Figure 14B:
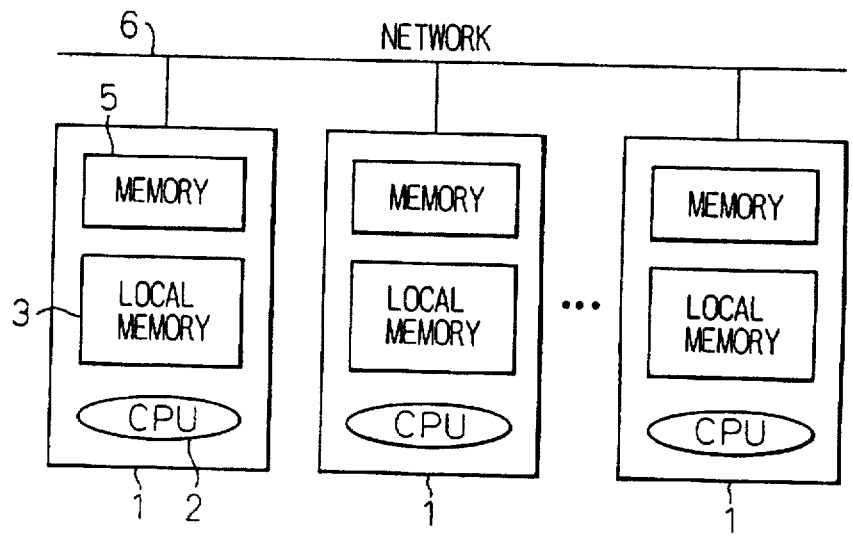
Figure 14C:
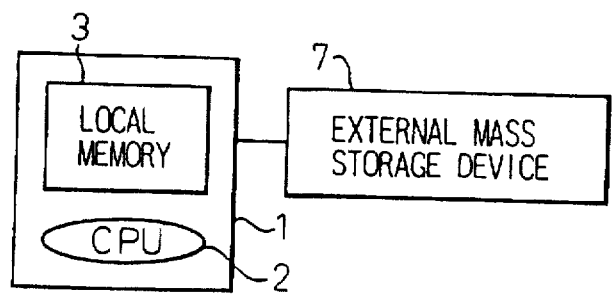

FIGS. 14a to 14c are diagrams illustrating a system constitution to which the present invention is adapted.

The method of processing data batch transfer according to the present invention can be adapted to a program which operates on a system having a memory structure of two strata as shown in FIGS. 14a to 14c.

The system of FIG. 14a is a parallel computer system in which a memory 4 is shared by the processor elements 1. Each processor element 1 comprises a CPU 2 and a local memory 3. When a loop of a program executed by the CPU 2 has an access to the array on the shared memory 4, the present invention reads the array data from the shared memory 4 into the local memory 3 just before the loop and writes it from the local memory 3 onto the shared memory 4 just after the loop, enabling the program to be executed at a high speed.

The system of FIG. 14b is the one of a parallel computer or a dispersed computer environment having a virtual shared memory, wherein the processor elements 1 are connected to each other through a network 6. Each processor element 1 has a CPU 2, a local memory 3 and a memory 5 which is accessible by other processors. The memories 5 arranged being dispersed in each of the processor elements 1 are, for example, so handled as to constitute a memory space as a whole. When it becomes necessary to make an access to the data of the memory 5, the CPU 2 copies the data of the memory 5 onto the local memory 3 and makes access thereto on the local memory 3. According to the present invention as described above, the memory 5 accessible by other processors can be used as the global memory 17 that is shown in FIG. 3b.

The system of FIG. 14c is a computer system having an external mass storage device 7. The processor element 1 has a CPU 2 and a local memory 3.

When the data on the external mass storage device 7 is to be referred to and updated, the processor element 1 copies the data on the local memory and makes an access thereto. Thus, the present invention can be adapted even to a system of a hierarchical memory consisting of the local memory 3 and the external mass storage device 7 to execute a program at high speeds.

Although the present invention has been disclosed and described by way of two embodiments, it is apparent to those skilled in the art that other embodiments and modifications of the present invention are possible without departing from the essential features thereof.

I claim:

1. A method for optimizing a program having a loop with access elements which access array data in a computer utilizing a high speed local first memory and a global second memory by defining a data batch transfer for use when data is written from the first memory into the second memory and also when the data is read from the second memory into the first memory wherein said second memory and said first memory form a hierarchical memory structure, said method comprising:

analyzing a preference order relation of the array data accesses in the loop;

classifying the array data accesses into groups that can share storage regions in said first memory;

calculating a sum of sets of access elements pertaining to each of the groups and determining a transfer range of array data for transferring into the first memory; and generating, outside the loop, an instruction code for batchwisely making accesses to the array data in the transfer range for each of the groups.

2. A method according to claim 1, wherein the transfer range includes a read transfer range and a write transfer range, and wherein said step of calculating a sum of sets includes a substep of extracting from the read transfer range, a set of unused access elements from a plurality of sets of access elements referred to in the loop for the array data accesses pertaining to each of said groups, and a substep which finds a sum of sets of access elements for the read transfer range and for the write transfer range for each of the groups, and determines transfer range.

3. A method according to claim 2, wherein said step of generating an instruction code includes a substep which forms, before a corresponding loop, an instruction code that batchwisely accesses the array data in the second memory in said read transfer range, and forms, after said loop, an instruction code that batchwisely accesses the array data in the second memory in said write transfer range.

4. A computer system having a hierarchical memory structure comprising:

at least one processor;

a high speed first memory which is part of a hierarchical memory structure and which said processors accesses;

a second memory which is part of the hierarchical memory structure and works in cooperation with said first memory; and means for effecting an optimization processing of a program that operates in said computer system;

said means for effecting the optimization processing including:

means for calculating a preference order relation of data array accesses contained in a loop in the program, the loop having access elements which access the data array;

means for classifying the data array accesses in the loop into groups that share storage regions in said first memory;

means for finding a sum of sets of access elements for the data array accesses, pertaining to each of the groups, and determining a transfer range for the array data; and means for generating an instruction code outside the loop for batchwisely accesses the array data in said memory within a transfer range pertaining to each of said groups.

5. A computer system according to claim 4, wherein said second memory has one of a large capacity and a function of holding the data shared by other processors.

6. A computer system having a hierarchical memory structure comprising:

at least one processor;

a high speed first memory which is part of a hierarchical memory structure which said processor accesses;

a second memory which is part of the hierarchical memory structure and works in cooperation with said first memory; and means for effecting an optimization processing of a program that operates in said computer system;

said means for effecting the optimization processing including:

means for calculating a preference order relation of data array accesses contained in a loop in the program;

means for classifying the data array accesses in the loop into groups that share storage regions in said first memory;

means for defining a read transfer range including a set of access elements referred to in the loop pertaining to each of the groups and which excludes a set of access elements define prior to the reference, defining a write transfer range, finding the sum of sets of access elements in the read transfer range and the write transfer range for each of the groups, and determining a total range of transferring the data; and means for generating, before a corresponding loop instruction; an instruction code that batchwisely accesses the array data in said read transfer range, and forming, after said loop instruction, an instruction code that batchwisely accesses the array data in said write transfer range.

7. A computer system according to claim 6, wherein said second memory has one of a large capacity and a function of holding data shared by other processors.

* * * * *

UNITED STATES PATENT AND TRADEMARK OFFICE
CERTIFICATE OF CORRECTION

PATENT NO. : 5,799,183
DATED : August 25, 1998
INVENTOR(S) : Hidetoshi Iwashita

It is certified that error appears in the above-identified patent and that said Letters Patent is hereby corrected as shown below:

Column 5,
Line 6, after "memory" insert -- 17 --.

Column 6,
Lines 31, 32, 40, 41, 44 and 50, change "E" to -- $\Sigma$ --.

Column 7,
Line 4, delete "(b)";
Line 5, before "Determination" insert -- (b) --.
Line 50, change "E" to -- $\Sigma$ --.

Column 9,
Lines 13, 14, 21, and 22, change "E" to -- $\Sigma$ --.
Line 46, change "u2" to -- u1 --.

Column 10,
Line 40, change "E" to -- $\Sigma$ --;
Line 53, delete "30".

Column 11,
Line 7, change "E" to -- $\Sigma$ --;
Lines 62-63, delete paragraph break.

Signed and Sealed this

Twenty-third Day of October, 2001

Attest:

NICHOLAS P. GODICI
*Attesting Officer*  *Acting Director of the United States Patent and Trademark Office*